United States Patent Office 2,878,130
Patented Mar. 17, 1959

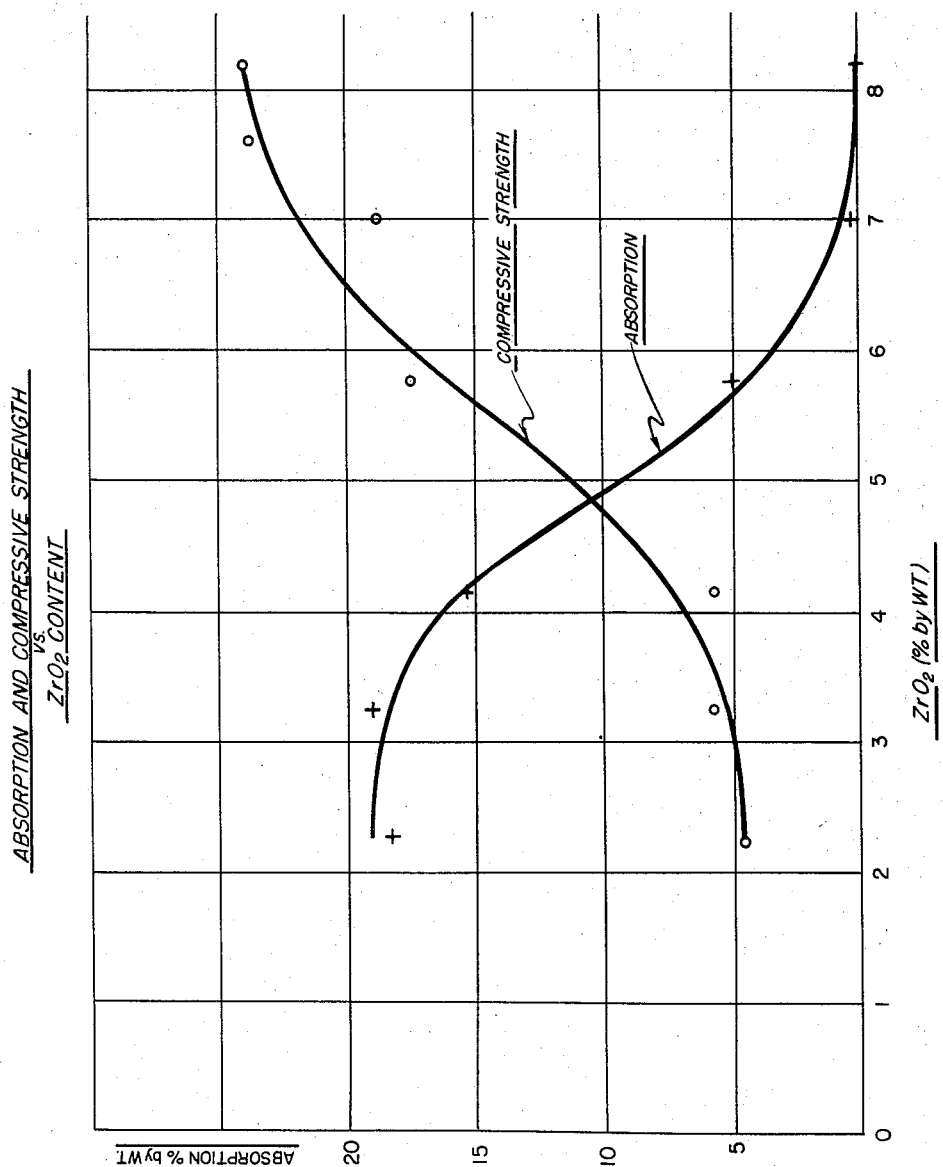

2,878,130

LOW LOSS CERAMIC INSULATORS

Cameron G. Harman, Cleveland, Ohio, and Robert D. Fenity, Hopkins, Minn., assignors to The Star Porcelain Company, Trenton, N. J., a corporation of New Jersey Application September 17, 1957, Serial No. 684,601

4 Claims. (Cl. 106—46)

This invention relates to ceramic bodies and in particular to ceramic bodies useful as low loss insulators.

Ceramic electrical insulators are of two types: those in which electrical capacity is of prime consideration, and those in which the insulating properties are of first importance. The present disclosure deals with the latter type, generally classed as low loss insulators. The quality of a low loss insulator is measured by a quantity termed the loss factor. This factor is the arithmetical product of the dielectric constant times the dissipation factor of the vitrified ceramic. The dielectric constant is the ratio of the capacity of the insulator to the capacity of a vacuum of the same dimensions. The dissipation factor is a measure of the amount of electrical power lost from leakage or any other power consuming process in the ceramic. The product of these two figures is proportional to the total electrical losses due to the insulator.

Low loss insulators are ordinarily classified according to the Army-Navy Specification JAN–I–LO which sets up the following grades:

| Grade | L–1 | L–2 | L–3 | L–4 | L–5 | L–6 |
|---|---|---|---|---|---|---|
| Loss Factor | 0.150 | 0.070 | 0.035 | 0.016 | 0.008 | 0.004 |

Loss factors for this classification are measured at a frequency of one megacycle per second after the samples have been soaked for 48 hours in distilled water at room temperature.

Many types of ceramic low loss insulators are in commercial production fulfilling the various needs for electrical, thermal and strength properties. These are usually identified by the major crystalline phase present, or the major raw material used, such as steatite, zircon porcelain, forsterite, and alumina. Although they may be composed of a variety of materials, all are manufactured by the same general ceramic techniques. The raw materials are usually high grade natural minerals, and are mixed in the proportions desired, in some cases with organic binders, and plasticizers, and an amount of water suitable for the method of forming used. The piece is formed by ceramic casting, extrusion, or pressing techniques, and the water is then thoroughly removed by heating at low temperatures. The pieces are fired in kilns and vitrified at maturing temperatures which ordinarily may range for various types of products from 2000° F. to 3000° F. After cooling, the insulators are ready for use in the electrical equipment for which they were designed. After firing, most low loss insulators have zero porosity and very smooth surfaces, both characteristics which are necessary for low electrical loss under humid conditions. Some insulators are glazed to improve the surface properties.

Perhaps the most popular low loss, high frequency insulators are those in which steatite (talc) is the major raw material. The principal raw material for this type of body is a special talc with 10 to 15 percent clay added for plasticity, and 5 to 15 percent barium carbonate included to increase the ageing stability. Other components may also be added. This general type of insulator falls into the L–4 or L–5 class and is fired in the general range from 2250° to 2350° F.

Conventional steatite insulators, however, have several disadvantages. One is their poor thermal shock resistance. It can be shown, for example, that upon being subjected to sudden heating and cooling, the strength of conventional steatite insulators sharply decreases and the insulator fails. This characteristic prevents their use in many industrial applications.

Another disadvantage to making low loss insulators from steatite is the extremely short temperature range, usually about ±10° F., over which these bodies mature or become non-porous. Below this general range, porosity remains, giving rise to high loss factors, while above the upper limit, blistering and deformation of the pieces occur. Commercially, it is difficult to control kiln temperatures closely enough to avoid a high percentage of badly fired ware. A large proportion of defective bodies increases production costs. Moreover, extremely close control of the composition of the talc and other raw materials is required to consistently produce L–5 insulators.

For these reasons, there has been a strong interest and need in the industry for a more easily produced low loss insulator composition with electrical and physical properties equal to or better than those of steatite.

Various compositions have been proposed by which low loss insulators can be manufactured, which will avoid the shortcomings of steatite bodies. However, in many cases it has been found that such compositions have other defects which render them little better than steatite. In particular it has been difficult to find compositions which would be electrically equivalent to steatite, which would have a wide firing range, good thermal shock resistance, and also the high mechanical strength and low water absorption necessary for many applications.

According to the invention these requirements are met by means of a vitrified ceramic low loss insulator body having a crystalline phase and a glass phase, the crystalline phase being predominantly anorthite, and the glass phase comprising a specified amount of dispersed and dissolved $ZrO_2$. Compositions according to the invention have a fired analysis consisting essentially of between about 18% and about 22% by weight of an alkaline earth component selected from the group consisting of CaO; CaO and BaO; CaO, BaO and MgO; and CaO and MgO, between about 26% and about 37% by weight of $Al_2O_3$, between about 38% and about 45% by weight of $SiO_2$ and between about 2.0% and about 16% of $ZrO_2$. The proportions of BaO and MgO should not exceed 4% and 2% respectively, on the weight of the whole body. The combined proportions of $ZrO_2$ and $SiO_2$ should not exceed about 56%. Preferably the bodies contain over 5.0% of $ZrO_2$.

The drawing comprises a single figure which is a graph showing the effect of $ZrO_2$ on the compression strength and absorption of bodies made according to the invention.

The present invention is based on the discovery that bodies having the composition specified in which anorthite is the principal crystalline phase, have good electrical properties, high resistance to thermal shock, and a relatively broad firing range. In particular it has been found that the presence of a zirconia ($ZrO_2$) component in the claimed compositions gives a product having high mechanical strength and low water absorption. These properties are exceptionally striking when the proportion of the zirconia component is above about 5%.

Anorthite is calcium feldspar of the formula $$CaO \cdot Al_2O_3 \cdot 2SiO_2$$

which crystallizes in the triclinic system. Its natural occurrence in pure form is uncommon, although plagioclase, an isomorphous series between anorthite and albite ($NaO \cdot Al_2O_3 \cdot 2SiO_2$), is extremely common. Anorthite can, however, be made synthetically with relative ease from a number of inexpensive materials.

Low loss insulator bodies according to the present invention, may be prepared by firing compositions, which will give anorthite as the primary crystalline phase, in combination with a zirconia bearing fluxing component. This fluxing component may be based on alkaline earth silicates containing zirconia or alkaline earth silicates with zirconium silicate. Of the alkaline earth silicates, calcium, magnesium and barium silicates have been found especially suitable, and thus, as set forth above, fired bodies according to the invention may include MgO or BaO, or both MgO and BaO. The proportion of MgO should not exceed about 2% by weight, and the proportion of BaO should not exceed about 4% by weight.

The effect of $ZrO_2$ on bodies of the present invention is shown graphically in the drawing. In preparing this graph, samples were made up of an anorthite base consisting of (percentage by weight)

| | Percent |
|---|---|
| Kaolin | 71.9 |
| Whiting ($CaCO_3$) | 25.6 |
| Wollastonite | 2.5 |
| | 100.0 | and to this base various amounts of calcium zirconium silicate ($CaZrSiO_5$) were added. The bodies were fired at about 2500° F. and tested for compressive strength and water absorption, using the technique described in A. S. T. M. Designation D 667–44, "Standard Methods of Testing Steatite Used for Electrical Insulation," A. S. T. M. Standards, 1955, part 6, page 791.

As shown in the graph, in the system defined above, 2–4% of $ZrO_2$ will give bodies having a compressive strength of around 10,000 p.s.i. When the zirconia is increased to 5%, compressive strength is increased to over 20,000 p. s. i. and at 7% is over 40,000 p. s. i. Similarly at 2–4% of $ZrO_2$, water absorption is 15–20%. At 5% of $ZrO_2$, it has decreased to less than 10% and at 7% of $ZrO_2$, it is substantially zero. It will be understood that these figures are cited merely by way of illustration, and the optimum proportion of $ZrO_2$ for any particular body will depend on the other ingredients present in that body.

The various ingredients required in the present composition may be added in any convenient form to make up the raw batch before firing. Thus, CaO may be added as such or, for example, as calcium carbonate, or wollastonite. Alumina may be added as such, or, for example, as clay, kyanite or kaolin. Silica may be added as such, or, for example, as clay, wollastonite, kaolin, kyanite, or as zirconium silicates. Zirconia is preferably added as an alkaline earth silicate, such as $CaZrSiO_5$, $BaZrSiO_5$, or $MgZrSiO_5$; or as zirconium silicate ($ZrSiO_4$).

In forming articles from compositions according to the invention, the materials are reduced to a finely divided form, preferably to a particle size through about 200 mesh, usually to through about 325 mesh and are mixed in either the wet or dry state. They are then shaped by known ceramic techniques, for example by extrusion, pressing, or casting.

Suitable articles have been made by dry-pressing at 4000–20,000 p. s. i. However, to aid in shaping the mixture, a suitable quantity of a vehicle, or a vehicle with a binder may be used. The vehicle may be simply water, or it may be an organic liquid of the type customarily used by the art, for example, acetone. It should be selected to be completely eliminated from the body during firing.

If a binder is used, it may be selected from those organic binders well known to the art, which will be eliminated from the composition during firing, for example, cellulose acetate.

The shaped article with or without vehicle or binder is dried in conventional manner, if necessary, and fired.

Many variations on the general procedure outlined above are possible. One such modified procedure which has proved highly successful is to calcine a portion of the raw mix at about 200° F. below the temperature at which the end product is to be fired, grind the calcine to say 325 mesh, then mix it with 10–40% uncalcined material and shape and fire the mixture.

Firing is carried out at a temperature between about 2400° F. and about 2600° F. in an oxidizing or inert atmosphere. After firing, the bodies are kiln-cooled to room temperature. The firing time is variable, depending on the particular composition and the size of the article being fired, but will generally be between about 10 and about 48 hours.

The invention will be further described by the following specific examples. It will be understood that these examples are given for purposes of illustration only, and are not to be taken as in any way restricting the invention beyond the scope of the appended claims.

For convenience, the examples will be given in tabular form. Except where noted otherwise, the raw materials having a particle size through about 300 mesh were thoroughly mixed to give a raw batch which was then dry pressed at about 4100 p. s. i. to form a disc one inch in diameter.

Firing was conducted in a small electric furnace. Between room temperature and the maximum given in the tables, the rate of heating was 600° F./hr. The samples were kept at maximum temperature for 20 minutes, after which the furnace was allowed to cool naturally. Under the prevailing conditions the cooling rate amounted to 600° F. in the first one-half hour, 600° F. in the next hour, 600° F. in the next two hours and 600° F. in the next four hours. Microscopic examination of the cooled samples showed anorthite as the major crystalline phase, present in substantial quantities throughout the body.

The ingredients used in the various examples, the firing temperature, and the fired composition are listed in Table I, below. Table IA is given to show the composition of the various components used in the raw batch. It will be understood that in the fired oxide compositions given in Table I, no attempt was made to account for minor impurities such as $Fe_2O_3$, $TiO_2$, and the like.

Table I

| Example | I | II | III | IV | V | VI | VII | VIII | IX |
|---|---|---|---|---|---|---|---|---|---|
| Raw Batch Composition, Wt. Percent: | | | | | | | | | |
| Kaolin | 41.6 | 37.3 | 30.7 | 29.3 | 29.3 | 27.9 | | | |
| $CaCO_3$ | 16.3 | 13.3 | 11.0 | 10.5 | 10.5 | 10.0 | | | |
| Wollastonite | 13.8 | 16.7 | 20.2 | 19.3 | 19.3 | 18.3 | 33.7 | 33.7 | 41.2 |
| Kyanite | 18.2 | 23.1 | 28.6 | 27.2 | 27.2 | 25.8 | 17.9 | 17.9 | 17.9 |
| $CaZrSiO_5$ [1] | 10.1 | 9.6 | 9.5 | 12.2 | 10.7 | 13.5 | 15.0 | 10.0 | |
| NY Talc | | | | 1.5 | 3.0 | 4.5 | | 5.0 | |
| $ZrSiO_4$ [1] | | | | | | | | | 7.5 |
| $BaZrSiO_5$ [1] | | | | | | | | | |
| $Al_2O_3$ | | | | | | | 11.6 | 11.6 | 11.6 |
| Ball Clay | | | | | | | 21.8 | 21.8 | 21.8 |
| Firing Temp., °F | [2]2,400 | [2]2,400 | [2]2,400 | [2]2,400 | [2]2,400 | [2]2,400 | [2]2,417 | [2]2,417 | [2]2,417 |
| Fired Composition, Wt. Percent: | | | | | | | | | |
| CaO | 20.7 | 19.8 | 19.8 | 19.5 | 19.2 | 18.9 | 19.9 | 18.5 | 20.9 |
| $Al_2O_3$ | 31.9 | 32.6 | 32.7 | 31.0 | 31.0 | 29.5 | 30.2 | 29.6 | 30.9 |
| $SiO_2$ | 41.4 | 42.0 | 42.2 | 42.5 | 42.5 | 42.3 | 41.9 | 45.1 | 42.8 |
| $ZrO_2$ | 6.0 | 5.5 | 5.4 | 6.9 | 6.1 | 7.6 | 8.0 | 5.2 | 5.4 |
| BaO | | | | | | | | | |
| MgO | | | | 0.5 | 1.0 | 1.6 | | 1.6 | |
| Total RO | 20.7 | 19.8 | 19.8 | 20.0 | 20.2 | 20.5 | 19.9 | 20.1 | 20.9 |
| Total $RO_2$ | 47.4 | 47.5 | 47.6 | 49.4 | 48.7 | 49.9 | 49.9 | 50.3 | 48.2 |

| Example | X | XI | XII | XIII | XIV | XV | XVI | XVII [3] | XVIII [3] |
|---|---|---|---|---|---|---|---|---|---|
| Raw Batch Composition, Wt. Percent: | | | | | | | | | |
| Kaolin | | 64.7 | 61.1 | 61.1 | 66.2 | 69.0 | 63.3 | 57.5 | 53.9 |
| $CaCO_3$ | | 23.0 | 21.8 | 21.8 | 23.5 | 24.6 | 22.5 | 20.5 | 19.2 |
| Wollastonite | 33.7 | 2.3 | 2.1 | 2.1 | 2.3 | 2.4 | 2.2 | 2.0 | 1.9 |
| Kyanite | 17.9 | | | | | | | | |
| $CaZrSiO_5$ [1] | 7.5 | 10.0 | 15.0 | 15.0 | 8.0 | 4.0 | 12.0 | 20.0 | 25.0 |
| NY Talc | | | | | | | | | |
| $ZrSiO_4$ [1] | | | | | | | | | |
| $BaZrSiO_5$ [1] | 7.5 | | | | | | | | |
| $Al_2O_3$ | 11.6 | | | | | | | | |
| Ball Clay | 21.8 | | | | | | | | |
| Firing Temp., °F | [2]2,417 | 2,600 | 2,500 | 2,600 | 2,500 | 2,600 | 2,550 | 2,435 | 2,435 |
| Fired Composition, Wt. Percent: | | | | | | | | | |
| CaO | 18.4 | 20.4 | 20.0 | 20.0 | 20.1 | 20.1 | 20.1 | 20.1 | 20.1 |
| $Al_2O_3$ | 30.3 | 32.6 | 30.2 | 30.2 | 33.1 | 34.9 | 31.4 | 28.0 | 26.0 |
| $SiO_2$ | 41.1 | 40.6 | 40.5 | 40.5 | 41.8 | 42.5 | 41.0 | 39.6 | 38.7 |
| $ZrO_2$ | 6.9 | 6.4 | 9.3 | 9.3 | 5.0 | 2.5 | 7.5 | 12.3 | 15.2 |
| BaO | 3.3 | | | | | | | | |
| MgO | | | | | | | | | |
| Total RO | 21.7 | 20.4 | 20.0 | 20.0 | 20.1 | 20.1 | 20.1 | 20.1 | 20.1 |
| Total $RO_2$ | 48.0 | 47.0 | 49.8 | 49.8 | 46.8 | 45.0 | 48.5 | 51.9 | 53.9 |

[1] For analysis see Table IA.
[2] Cone 11.
[3] Extruded.

Table IA

| Constituent | Raw Batch Component—Percent by Weight | | | | | | | | |
|---|---|---|---|---|---|---|---|---|---|
| | Kaolin | Wollastonite | Kyanite | $CaZrSiO_5$ | NY Talc | Ball Clay | $CaCO_3$ | $BaZrSiO_5$ | $ZrSiO_4$ |
| CaO | | 46.90 | | 19.61 | 6.5 | 0.37 | 56.0 | 0.13 | |
| MgO | | | | | 30.7 | 0.30 | | | |
| BaO | | | | | | | | 41.10 | |
| $SiO_2$ | 44.98 | 50.90 | 37.70 | 25.90 | 54.5 | 53.96 | | 21.15 | 32.90 |
| $ZrO_2$ | | | | 50.23 | | | | 36.08 | 66.12 |
| $Al_2O_3$ | 39.50 | | 58.77 | 0.13 | 1.3 | 29.34 | | 0.32 | 0.37 |
| $Fe_2O_3$ | 0.64 | 0.55 | 1.17 | 0.07 | | 0.98 | | 0.06 | 0.07 |
| $TiO_2$ | 1.01 | 0.05 | 1.30 | 0.12 | | 1.64 | | 0.16 | 0.34 |
| $Na_2O$ | | | | | | 0.12 | | 0.15 | |
| $K_2O$ | | | | | | 0.28 | | | |
| Ignition Loss | 13.51 | 0.09 | 0.38 | 0.96 | 5.5 | 12.82 | 44.0 | 0.98 | |

Various tests were carried out to demonstrate the qualities of the bodies described in Table I.

Among the properties determined were loss factor, fired shrinkage, compressive strength, dielectric constant, and absorption.

Fired shrinkage is the percentage change in linear dimensions of an object during firing. It is important because materials having high shrinkages require complicated die shapes which are expensive to make. For the technique used in determining fired shrinkage see A. S. T. M. Standards, 1955, part 3, pages 788 to 789.

Absorption means the amount of moisture which a body will pick up under controlled conditions, expressed as a percentage of its own dry weight. Its importance is believed obvious. Bodies having high absorption could not be used as low loss electrical insulators under humid conditions. The technique used in determining absorption is described in A. S. T. M. Standards, 1955, part 3, page 818.

The significance of compressive strength, loss factor and dielectric constant are believed obvious. These properties were determined by standard techniques.

The firing range for certain compositions was also determined. Thus, the compositions of Examples XI–XVI can be fired at any temperature within the range set forth, which may be as broad as 150° F. This compares most favorably with conventional steatite bodies, which, as pointed out above, have a firing range of around ±10° F.

The properties observed for the bodies produced as described in Table I are set forth in Table II.

Table II

| Example | Loss Factor | Fired Shrinkage, Percent | Compressive Strength, #/In.² | Dielectric Constant | Absorption, Percent | Firing Range, °F. |
|---|---|---|---|---|---|---|
| I | 0.015 | 8.2 | 34,000 | 6.86 | 5.6 | |
| II | 0.011 | 6.4 | 31,500 | 6.84 | 6.7 | |
| III | 0.003 | 7.0 | 33,100 | 6.92 | 0.2 | |
| IV | | 8.6 | 35,000 | | 0.0 | |
| V | | 9.2 | 30,900 | | 0.0 | |
| VI | | | | | | |
| VII | 0.004 | 6.0 | 23,000 | 6.83 | 0.01 | |
| VIII | 0.004 | 5.7 | 31,000 | 6.55 | 0.06 | |
| IX | 0.004 | 5.1 | 31,000 | 6.66 | | |
| X | 0.004 | 5.9 | 28,000 | 6.68 | | |
| XI | 0.0022 | | 27,700 | 6.18 | 0.00 | 2,500–2,550 |
| XII | 0.0119 | | 47,500 | 6.14 | 0.00 | 2,500–2,550 |
| XIII | 0.0034 | | 22,700 | 5.35 | 0.00 | 2,500–2,625 |
| XIV | | | 52,200 | | 0.00 | 2,550–2,400 |
| XV | | | 36,100 | | 2.7 | 2,500–2,550 |
| XVI | 0.0239 | | 42,700 | 6.23 | 0.01 | 2,550–2,450 |
| XVII | 0.016 | | 26,000 | 7.12 | 0.00 | |
| XVIII | 0.020 | | 20,000 | 7.67 | 0.00 | |

To demonstrate in particular the superiority of bodies in accordance with the present invention over conventional low loss insulators with respect to thermal shock resistance, the following experiment was performed.

Two ½" diameter rods of the compositions given in Examples XI and XVI (Table I) were formed by extrusion. After firing to vitrification at the temperature indicated in Table I, they were submitted to a thermal shock test along with commercial porcelain and steatite bodies. In the shock test, the samples were placed in an electrically heated furnace at 1500° F. and 2200° F. for 15 minutes. They were then withdrawn and placed directly in an air blast at room temperature. After 15 minutes of cooling, the cycle was repeated.

The results of the thermal shock test are shown in Table III. As will appear from that table, the standard porcelain body failed after two cycles from 1800° F. The commercial steatite body showed a marked decrease in strength after the fifth, and failed on the fourteenth cycle from 2200° F. Both anorthite bodies withstood 14 cycles from 2200° F. without loss of strength.

Table III

| Body Temperature | No. of Cycles | Porcelain | Steatite | Example | |
|---|---|---|---|---|---|
| | | | | XI | XVI |
| 1,000° F. | 5 | 13,000 | 24,000 | 22,000 | 17,500 |
| 1,800° F. | 5 | failed | 30,000 | 22,000 | 19,000 |
| 2,200° F. | 5 | | 16,000 | 24,000 | 24,000 |
| 2,200° F. | 14 | | failed | 28,000 | 22,000 |

From the foregoing description, it will be seen that the present invention provides low loss insulator bodies having good loss factors, high thermal shock resistance and a broad maturing range. They also have comparatively low shrinkage in firing, making them easier to mold than conventional steatite bodies. Finally, they may be made with raw materials which are considerably cheaper than those required for steatite insulators.

What is claimed is:

1. A fired ceramic body having properties suitable for a low loss insulator comprising a glass phase and a crystalline phase, said crystalline phase consisting essentially of anorthite; and said body having a fired oxide composition consisting essentially of between about 18 and about 22% by weight of an alkaline earth component selected from the group consisting of CaO; CaO and BaO; CaO, BaO, and MgO; and CaO and MgO, the proportion of MgO not exceeding about 2% on the weight of the fired body and the proportion of BaO not exceeding about 4% on the weight of the fired body, between about 26% and about 37% by weight of $Al_2O_3$, between about 38% and about 45% by weight of $SiO_2$, and between about 2 and about 16% by weight of $ZrO_2$, the total combined proportions of $ZrO_2$ and $SiO_2$ not exceeding about 56% on the weight of the body.

2. The body claimed in claim 1 wherein the alkaline earth component comprises CaO and BaO.

3. The body claimed in claim 1 wherein the alkaline earth component comprises CaO and MgO.

4. The body claimed in claim 1 wherein the proportion of $ZrO_2$ is above about 5% on the weight of the body.

References Cited in the file of this patent
UNITED STATES PATENTS

| 1,370,276 | Buckman | Mar. 1, 1921 |
| 2,231,945 | Pole | Feb. 18, 1941 |
| 2,308,115 | Schwartzwalder et al. | Jan. 12, 1943 |
| 2,726,963 | Jackson | Dec. 13, 1955 |